Oct. 13, 1959  R. D. POWELL  2,908,177
DISK GREASE SEALS

Filed July 5, 1957  2 Sheets-Sheet 1

Inventor
Robert D. Powell
By Robert C. Benson
Attorney

Oct. 13, 1959 R. D. POWELL 2,908,177
DISK GREASE SEALS

Filed July 5, 1957 2 Sheets-Sheet 2

Inventor
Robert D. Powell
By Robert B. Benson
Attorney

United States Patent Office 2,908,177
Patented Oct. 13, 1959

2,908,177

DISK GREASE SEALS

Robert D. Powell, Madeira, Ohio, assignor to Allis-Chalmers Manufacturing Company, Milwaukee, Wis.

Application July 5, 1957, Serial No. 670,323

6 Claims. (Cl. 74—230.17)

This invention relates generally to the lubrication of mechanical elements such as variable pitch diameter sheaves. More particularly this invention is related to sealing means for preventing the leakage of lubricant from the bearing surfaces of the axially movable disks of the sheave.

In variable pitch diameter sheaves having axially movable disks forming belt engaging grooves it is very important to keep these disks properly lubricated during the operation of the sheave. If the disks are not properly lubricated fretting corrosion occurs where the disks are mounted on the shaft or other rotating member. The fretting corrosion builds up and makes it extremely difficult and often impossible to move the disk axially along the shaft to vary the pitch diameter of the sheave. It is also important when lubricating the disks of a variable pitch sheave to keep the lubricant from leaking out and being thrown on to the V-belts. If the lubricant is thrown on the V-belts, the belts slide and slip in the grooves of the sheave thereby reducing the efficiency of the drive and the effective operation of the sheave. Furthermore, if the lubricant gets on the belts it is very difficult to maintain a close speed control on the sheave.

Variable pitch diameter sheaves are often constructed of frusto-conical faced disks mounted on cylindrical power transmission elements through the use of flanged supporting lugs of arcuate form circumferentially spaced to interdigitate with similar lugs on other relatively moving disks of similar construction. Many attempts have been made in the prior art to devise an efficient system for adequately lubricating the axially movable disks of such a sheave while at the same time preventing excessive leakage of the lubricant. One of the most successful methods known in the prior art has been that of using keys positioned in the power transmission member and having longitudinally extending lubricant channels. Lubricant is forced from the lubricant channels outwardly through a plurality of longitudinally spaced metering holes in the key to the surface of the disk lugs to be lubricated. However, due to the almost unavoidable clearance between the lugs and the power transmission member there is a considerable amount of lubricant leakage from beneath the disks.

Applicant overcomes the problems mentioned above in connection with variable speed V-belt sheaves by calling for a sealing means for retaining the lubricant on the surface beneath the axially extending lugs which is the area to be lubricated. The sealing means consist of an O-ring or other suitable sealing device which is embedded in a groove which extends around a closed area on the bearing surface of the lugs to confine the lubricant in the area to be lubricated.

Therefore it is the object of this invention to provide a new and improved lubricating system for variable pitch diameter sheaves.

Another object of this invention is to provide a new and improved lubricant seal for rotating mechanical elements.

Another object of this invention is to provide a new and improved lubricant seal for variable pitch diameter sheaves of the interdigitated lug construction.

Other objects and advantages of this invention will be apparent from the following description when read in connection with the accompanying drawing, in which.

Figure 1:
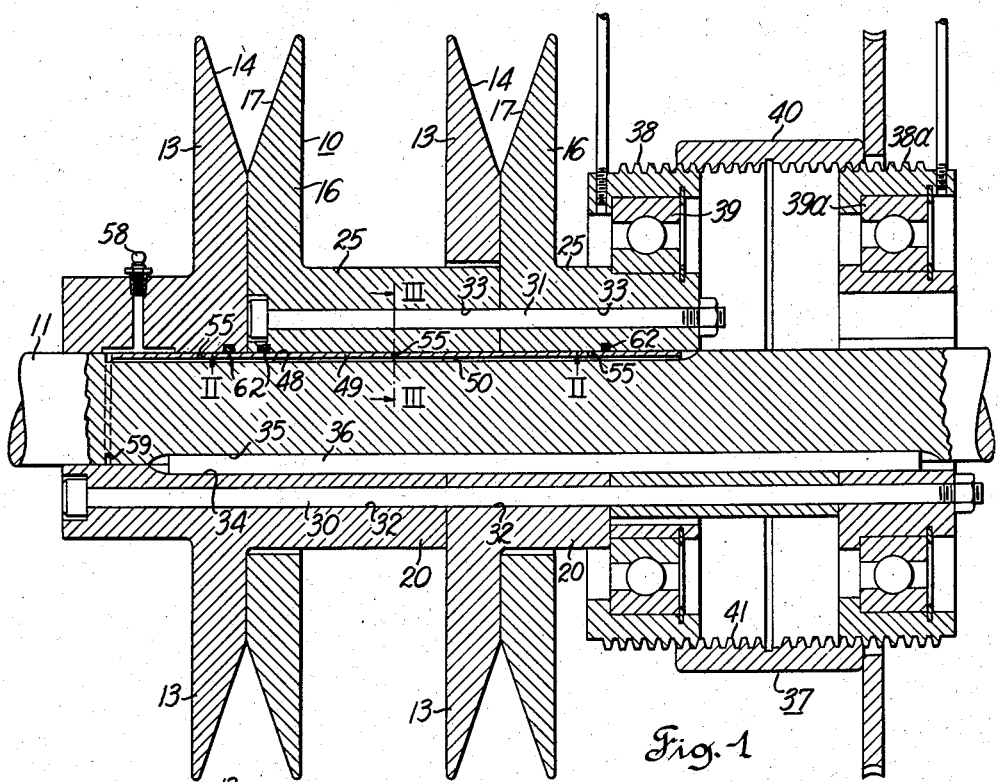
Fig. 1 is a cross section view of a sheave embodying the lubricant seal of this invention.

Referring now in particular to the drawings, the lubrication system of this invention is illustrated in Fig. 1 in connection with a multiple groove variable pitch diameter sheave. In the sheave 10 of this invention the shaft 11 constitutes a generally cylindrical power transmission element. Upon this shaft 11 are mounted a group of similarly facing sheave disks 13 having frusto-conical faces 14 and a second group of oppositely facing sheave disks 16 with frusto-conical faces 17. The two groups of disks 13 and 16 are relatively movable axially on the shaft 11 and are alternatively arranged to form cooperating pairs of oppositely facing disks 13 and 16 with opposed frusto-conical faces 14 and 17. The disks 13 and 16 are relatively movable toward and away from each other to expand and contract the effective pitch diameter of the sheave with reference to a given size of V-belt or other interposed frictional drive element not shown.

Certain of the disks 13 are formed with arcuate axially extending bearing lugs 20 which are circumferentially spaced forming an annular series. The inner arcuate surfaces 21 of these lugs 20 fit the cylindrical external surface of the shaft 11 in axially slidable relation. Each disk 13 having such lugs 20 is apertured between such lugs 20 to a size larger than the size of the lugs 20.

Certain of the disks 16 are formed with a series of arcuately spaced lugs 25, similar to the lugs 20, and have similar arcuate bearing surfaces 26. Each of these disks 16 is apertured between the lugs 25 to a size larger than the lugs. 25. In assembly each series of lugs 20, 25 is interdigitated and passes through the apertures between the arcuately spaced lugs on an adjacent disk.

The lugs 20, 25 serve as spacer struts between the individual disks of a set. Suitable tie bolts 30 and 31 are passed through suitable holes 32, 33 in the disks 13, 16 and lugs 20, 25 of their respective sets and serve to fix the relative axial position of each disk in a set relative to the others so that the two sets of disks are movable as units relative to each other axially on the shaft.

The disks can be mounted on the shaft 11 in any suitable way but preferably, as shown, the longitudinally extending keyways 34, 35 are formed in one set of axially aligned lugs 20 of the disks 13 and in the shaft 11 respectively for receiving a power transmission key 36. A similar keyway, not shown, is formed in one set of the axially aligned lugs 25 of the disks 16 for receiving a power transmission key. If desired similar keyways for driving keys can be formed in each set of axially aligned lugs.

The position of the disks on the shaft may be varied in any of a number of well known ways but in the illustrated sheave and adjusting mechanism 37 is provided for moving the sets of disks axially along the shaft relative to each other. The adjusting mechanism 37 comprises a pair of externally threaded members 38, 38a, a pair of antifriction bearings 39, 39a and an adjusting collar 40. One of the members 38 is connected to an extension of the hub of one of the disks 16 by the bearing 39 to mount the member 38 on the set of disks 16 for imparting axial movement to the set. The other member 38a is connected to the hub of one of the disks 13 by the bearing 39a and the bolt 30 for imparting axial movement to the set of disks 13. One of the members has a right hand thread and the other member has a left hand thread. The adjusting collar 40 has a threaded bore 41 which operatively engages both members 38 and 38a. Rotation of the collar in one direction causes the members 38 and 38a to converge axially toward each other while rotation of the collar in the other direction causes the members to move axially away from each other. The axial motion of the numbers 38 and 38a is imparted to the sets of disks 16 and 13, respectively, to vary the effective pitch diameter of the sheave.

The disks 13 and 16 and their lugs 20 and 25 are so proportioned and positioned on the shaft 11 that the disks 13 and 16 can only move axially through a distance substantially less than the length of their respective lugs. Thus certain points or circumferentially spaced areas on the external cylindrical surface of the shaft will normally be covered by the inner arcuate bearing surfaces of the lugs 20, 25.

Suitable means are provided for conducing lubricant to the bearing surfaces of the lugs 20, 25. Preferably as shown on the shaft 11 is provided with plurality of longitudinally extending keyways 48 and lubrication keys 49. The keys 49 and the keyways 48 cooperate to form longitudinally extending lubricant passages 50. The keys 49 have a plurality of longitudinally spaced metering holes 55 positioned immediately beneath the bearing surface of the lugs 20, 25 for conducting the lubricant to the bearing surfaces of the lugs.

The lubricant can be brought into the lubricant channels 50 of the sheave 10 by any suitable means. However, in this application the lubricant is forced into the sheave 10 through the lubricant fittings such as the fitting 58 positioned at one end of the sheave. The fitting 58 is in communication with an annular groove 59 in the shaft 11 which in turn is in communication with all of the longitudinally extending lubricant channels 50.

A groove 60 is formed in the arcuate bearing surfaces of the disks 13, 16. The groove extends around the bearing surfaces to define a closed bearing area 61. Means such as described above are provided for supplying lubricant to the defined bearing area 61 and a suitable sealing material 62 is positioned in the groove 60 to prevent the leakage of lubricant from the closed bearing area.

The groove 60 preferably comprises axially extending portions 64 and arcuate portions 65 that connect the axially extending portions to define a closed bearing area. In a sheave having more than one set of oppositely facing disks, the grooves in abutting disks cooperate to define a single closed area in each set of lugs. Preferably, as shown, the axially extending portions of the groove 60 in abutting disks are axially aligned and connect with the arcuate portions 65 of the groove near the outboard ends of the sheave to define a single closed bearing area for each set of disks (see Fig. 2). The arcuate portions 65 of the groove 60 are preferably in the hub or lugs of the end disks of the particular set of disks. A complete circumferential groove 67 may be used in the hub of an end disk of the sheave to prevent lubricant from flowing along the shaft beneath the hub and leaking between adjacent groove defining disks.

Figure 2:
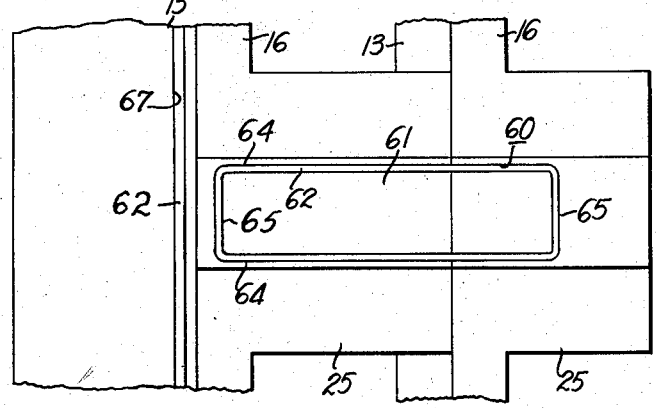
Fig. 2 is a layout view taken in the direction of the arrows II—II in Fig. 1 and shows the bore at one of the disks of the sheave.
Figure 4:
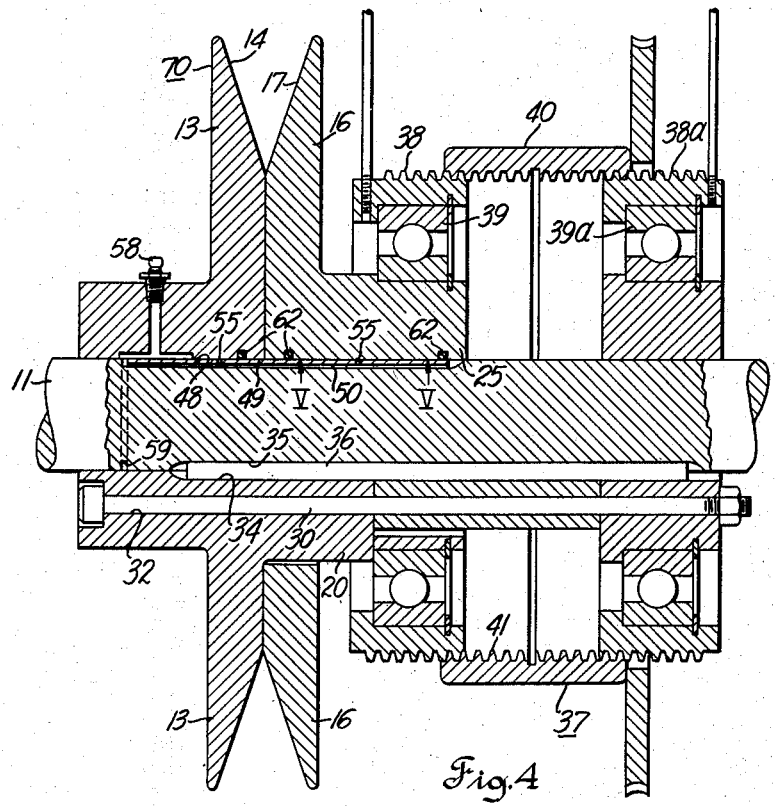
Fig. 4 is a cross section view of a single groove V-belt sheave embodying the lubricant seal of this invention.
Figure 5:
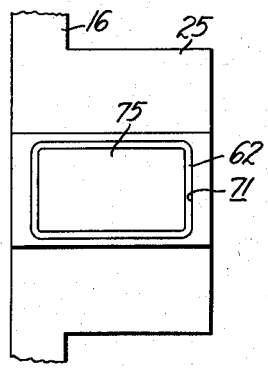
Fig. 5 is a layout view taken in the direction of arrows V—V in Fig. 4 and shows the bore of one of the disks of the sheave shown in Fig. 4.

The single groove sheave 70 illustrated in Fig. 4 is similar to the sheave 10 shown in Fig. 1 except that it has only one V-belt groove whereas the sheave of Fig. 2 has two grooves. Similar elements in both sheaves operate substantially the same way and are indentified by the same reference numerals. As shown in Fig. 5 the groove 71 and sealing material 62 extend around the bearing surface of the disk 16 near the periphery of the lugs 25 to define a closed bearing area 75. As in sheave 10 lubricant is directed in any suitable manner through lubrication keys 49 and radially outward to the closed bearing area 75 where it is confined by the seal 62. A similar groove 71 and associated sealing material extend around the bearing surface of disk 13 near the periphery of the lugs 20.

Figure 3:
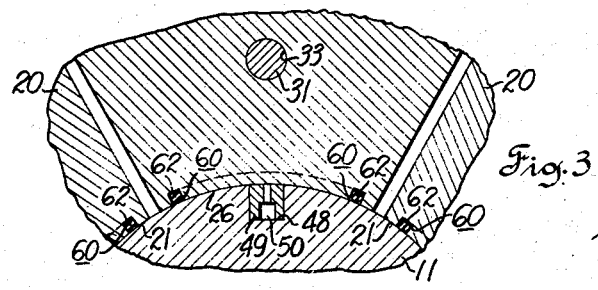
Fig. 3 is an enlarged cross section view taken along the line III—III of Fig. 1.

Materials such as standard O-rings or quad rings are preferred for the sealing material because they are conformable and function as both a seal and a resilient cushion. As best illustrated in Fig. 3, the seal material 62 extends radially slightly beyond the bearing surface of the lugs to form a seal and a cushion for the disks. The cushion effect of the resilient seal cuts down the amount of vibration between the disks and the shaft thereby further reducing fretting corrosion. Tests have shown that such a sealing material in a groove in the lug bearing surfaces does not materially interfere with the axial movement of the disks relative to the shaft.

The operation of both sheaves 10 and 70 is substantially the same. Therefore only the operation of sheave 10 will be explained in detail. The lubricant is initially brought into the sheave 10 through the fitting 58 into the annular groove 59 around the periphery of the shaft 11. As the lubricant builds up in the annular groove 59 it is forced down through the channels 50 formed in the keyways 48 by the undercut portions of the inlaid keys 49. The lubricant is then forced outward through the metering holes 55 to the internal surface of the axially extending lugs defined by the groove 60 to lubricate those surfaces which are bearing on the shaft. The lubricant is retained in the closed area 61 by sealing material 62.

It will be understood that the details of the embodiment of the invention described hereinabove and illustrated in the drawings are by way of example only and that the lubrication systems will be capable of beneficial use in mechanisms other than sheaves. It will also be understood that modifications of details and substitutions of substantial equivalents may be made without departing from the spirit and teachings hereof, and that the invention is accordingly intended to include whatever lies within the legitimate scope of the appended claims.

What is claimed is:

1. In an expansion sheave of the axially movable disk type the combination comprising a power transmission element, a pair of disks mounted on said element in axially movable relation, the bearing surfaces of said disks each having a continuous groove forming the boundary of a closed area, means for supplying lubricant to said closed area, and a seal disposed in said groove to prevent lubricant leakage from said closed area.

2. In an expansion sheave of the axially movable disk type the combination comprising a power transmission element, a pair of frusto-conically faced disks mounted on said element in axially movable relation, at least one of said disks having an annular series of circumferentially spaced bearing lugs engaging said element in axially slidable disk supporting relation, the bearing surfaces of each of said lugs having a groove forming the boundary of a closed area, means for supplying lubricant to said closed areas, a seal disposed in said grooves to prevent lubricant leakage from said closed areas.

3. In an expansion sheave of the axially movable disk type the combination comprising a power transmission element having a generally cylindrical external surface, a pair of frusto-conically faced disks mounted on said element in axially movable relation, at least one of said disks having an annular series of circumferentially spaced bearing lugs engaging said cylindrical surface of said element in axially slidable disk supporting relation, the bearing surfaces of each of said lugs having a groove forming the boundary of a closed area, means for supplying lubricant to said closed areas in said lug bearing surface, and a resilient seal disposed in said grooves to prevent lubricant leakage from said closed areas.

4. In an expansion sheave of the axially movable disk type the combination comprising a power transmission element having a generally cylindrical external surface, a pair of frusto-conically faced disks mounted on said element in axially movable relation, said disks having an annular series of circumferentially spaced bearing lugs engaging said cylindrical surface of said element in axially slidable disk supporting relation, the bearing surfaces of each of said lugs having a groove forming the boundary of a closed area, means for supplying lubricant to said closed areas in said lug bearing surface, an O-ring disposed in said groove and extending radially inward beyond the bearing surface of said lugs to cushion said disks on said element and prevent lubricant leakage from said closed area.

5. In an expansion sheave of the axially movable disk type the combination comprising a power transmission element having a generally cylindrical external surface, first and second sets of frusto-conically faced disks mounted on said element, said disks of said first set being positioned on said element in alternating relation with the disks of said second set, some of said disks having an annular series of circumferentially spaced bearing lugs interdigitated with the lugs of an adjacent disk, said lugs engaging said cylindrical surface of said element in axially slidable disk supporting relation, the bearing surfaces of each of said lugs having grooves cooperating with grooves in abutting lugs to form the boundary of a closed bearing area, means for supplying lubricant to said closed bearing areas in said lug bearing surfaces, and a resilient seal disposed in said grooves to prevent lubricant leakage from said closed areas.

6. In an expansion sheave of the axially movable disk type the combination comprising a power transmission element having a generally cylindrical external surface, first and second sets of frusto-conically faced disks mounted on said element, said disks of said first set being positioned on said element in alternating relation with the disks of said second set, some of said disks having an annular series of circumferentially spaced bearing lugs interdigitated with the lugs of an adjacent disk, said lugs engaging said cylindrical surface of said element in axially slidable disk supporting relation, the bearing surfaces of said disks in each of said sets having grooves cooperating to form the boundary of a closed area, means for supplying lubricant to said closed areas in said disk bearing surfaces, and a resilient seal disposed in said grooves to prevent lubricant leakage from said closed areas.

References Cited in the file of this patent

UNITED STATES PATENTS

| | | |
|---|---|---|
| 811,794 | Riddell | Feb. 6, 1906 |
| 2,746,816 | Michie | May 22, 1956 |